United States Patent
Huang et al.

(10) Patent No.: US 7,074,262 B2
(45) Date of Patent: Jul. 11, 2006

(54) SILICONE COMPOSITIONS FOR USE IN TIRE DRESSING AND METHODS OF MAKING

(75) Inventors: T. Clare Huang, Katy, TX (US); Ronald Logan Fausnight, Spring, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 10/722,840

(22) Filed: Nov. 25, 2003

(65) Prior Publication Data

US 2004/0171744 A1 Sep. 2, 2004

Related U.S. Application Data

(60) Provisional application No. 60/428,854, filed on Nov. 25, 2002.

(51) Int. Cl.
*C09G 1/04* (2006.01)

(52) U.S. Cl. .................. 106/3; 106/287.11; 510/189; 516/55

(58) Field of Classification Search ............... 510/189; 516/55; 106/3, 287.11
See application file for complete search history.

(56) References Cited

U.S. PATENT DOCUMENTS

| | | | |
|---|---|---|---|
| 3,956,174 A * | 5/1976 | Palcher .................. 252/400.31 |
| 4,600,436 A | 7/1986 | Traver et al. |
| 4,790,877 A | 12/1988 | Vadasz |
| 4,880,557 A * | 11/1989 | Ohara et al. ................. 510/189 |
| 4,999,398 A | 3/1991 | Graver et al. |
| 5,057,572 A | 10/1991 | Chrobaczek |
| 5,077,040 A | 12/1991 | Bergmann et al. ............ 424/70 |
| 5,183,845 A * | 2/1993 | Parkinson et al. .......... 524/726 |
| 5,244,598 A * | 9/1993 | Merrifield et al. ............ 516/55 |
| 5,326,483 A | 7/1994 | Halloran et al. |
| 5,378,271 A | 1/1995 | Arimoto et al. |
| 5,507,969 A * | 4/1996 | Shinohara et al. .......... 510/400 |
| 5,525,427 A | 6/1996 | Griswold et al. ........... 428/447 |
| 5,578,298 A * | 11/1996 | Berthiaume et al. ... 424/70.122 |
| 5,623,017 A * | 4/1997 | Hill ............................ 524/860 |
| 5,661,208 A | 8/1997 | Estes ......................... 524/457 |
| 5,759,983 A * | 6/1998 | Mondin et al. ............. 510/365 |
| 6,013,323 A * | 1/2000 | Klayder et al. ............. 427/384 |
| 6,071,975 A | 6/2000 | Halloran |
| 6,080,387 A * | 6/2000 | Zhou et al. ................... 424/45 |
| 6,147,038 A | 11/2000 | Halloran |
| 6,153,569 A | 11/2000 | Halloran |
| 6,180,117 B1 * | 1/2001 | Berthiaume et al. ........ 424/401 |
| 6,221,811 B1 * | 4/2001 | Policello et al. ............ 504/351 |
| 6,221,833 B1 * | 4/2001 | Colurciello, Jr. ............ 510/466 |
| 6,506,715 B1 * | 1/2003 | Schultz et al. .............. 510/189 |
| 6,602,835 B1 * | 8/2003 | Schmeida et al. .......... 510/202 |

OTHER PUBLICATIONS

Webster's Dictionary on line, definition of "microemulsion", 2006.*

* cited by examiner

*Primary Examiner*—Margaret G. Moore

(57) ABSTRACT

A tire dressing composition comprises a silicone emulsion system which polishes and protects tires, while at the same time imparting water repellency to the subject tires. In some embodiments, the tire dressing composition comprises a silicone microemulsion, a wetting agent, and optionally a fluorocarbon or hydrocarbon propellant when an aerosol system is used.

25 Claims, No Drawings

SILICONE COMPOSITIONS FOR USE IN TIRE DRESSING AND METHODS OF MAKING

CROSS REFERENCES TO RELATED APPLICATIONS

This patent application claims the benefit of U.S. Provisional Application No. 60/428,854, filed Nov. 25, 2002.

STATEMENT REGARDING FEDERALLY SPONSORED RESEARCH

Not Applicable.

FIELD OF THE INVENTION

The invention relates to a tire dressing composition and methods of use for tires of cars, bicycles and the like.

BACKGROUND OF THE INVENTION

As the mileage on a tire increases, the sidewall rubber surfaces often become dull and unattractive. This is due to various causes including wind, weather, sunlight, scratching, abrasion from dirt, and other chemical and physical reactions. Many products are available today on the market for tire dressing usage to address these adverse effects. These products are referred to hereinafter as "tire dressing products". Many of these products restore older appearance from a dull, weathered appearance to a shiny, bright, and like-new condition. For example, conventionally a dispersion of the silicone fluids in petroleum distillates or a conventional oil in water silicone emulsion system with milky or opaque appearance are often used to restore the attractive, bright, shiny, and like-new appearance on the tire surface. Typically conventional tire dressing formulas for dressing and appearance applications are products containing both high viscosity and low viscosity silicone fluids blended in petroleum distillates or products containing silicone emulsions prepared in aqueous systems with milky white and opaque appearance. When applied to a tire surface, the silicone composition forms a coating which develops a desired shiny appearance due to the unique structure of the silicone layer formed on the tire surface.

A solution or dispersion of silicone oil or wax in an organic solvent and an aqueous emulsion prepared therefrom with the aid of a surfactant are generally employed as tire dressing agents. However, while these polishing agents impart good gloss and acceptable water repellency to tires, they are readily stripped off by rain and dust so that the effects are relatively transitory or short-lived.

In addition, aqueous-based tire dressings typically show poor adherence to the surface of tires because of the low surface energy of the surface relative to the surface energy of the aqueous compositions. As a result most of the existing tire dressing products on the market use an organic solvent-based system, with silicone fluids dispersed in the hydrocarbon solvent, which have a lower surface energy than the tire surface. Therefore, there is a need for an improved tire-dressing composition, preferably aqueous-based, which could provide a durable, shiny, water-repellant coating on a tire surface. Preferably, such a tire-dressing composition is silicone-based.

SUMMARY OF THE INVENTION

An embodiment of the invention provides a tire dressing composition, comprising a silicone microemulsion and a wetting agent. In certain embodiments of the invention, the tire dressing composition is a sprayable product while in others, the tire dressing composition of the invention may be a gel-based product, either with or without pigments and glitter particles.

Another embodiment of the invention provides a method of forming a durable, shiny, water repellant coating on a tire, comprising, applying a tire-dressing composition to a surface of a tire, the tire-dressing composition comprising a silicone microemulsion.

BRIEF DESCRIPTION OF THE DRAWINGS

Not applicable.

DESCRIPTION OF EMBODIMENTS OF THE INVENTION

It has been found that the above-mentioned need can be satisfied by providing a composition comprising a silicone microemulsion system, a wetting agent and optionally, a fluorocarbon or hydrocarbon propellant if an aerosol system is desired. In some embodiments, the silicone compounds contained in the silicone microemulsion systems may undergo a condensation reaction on the surface of the tire to form a tough silicone film in intimate contact with the subject tire. The gloss and water repellancy of this silicone film imparts a highly lustrous and water-repellant surface to the tire. At the same time, the wetting agent reduces the surface tension of the silicone compounds, thereby allowing the composition to spread out and wet the tire surface.

In other embodiments, a tire polishing and protective composition comprises a silicone microemulsion system based on amino functional silicones and adjusted emulsifiers, i.e., surfactants and cosurfactants, with interfacial functionalities to emulsify the silicone compounds in an aqueous system to form a stable silicone microemulsion system, and a wetting agent which reduces the surface tension of the silicone compouuds in the silicone microemulsion system to allow the silicone compounds to wet and spread out on the tire surface. The tire polishing and protective composition optionally comprises a fluorocarbon or hydrocarbon propellant, if an aerosol system is desired.

In accordance with embodiments of the invention, the tire dressing compositions are capable of forming a durable, shiny, water repellent coating on a tire, which is resistant to water and detergent washings. The tire dressing composition exhibits good shine durability under wet weather conditions and exhibits low surface tension enabling better spreadability on tire surface with uniformity in gloss. Prefereably, the tire dressing compositions are handled by consumers by a simple trigger spray and walk away method or other simple application methods such as sponging onto the tire surface.

Any silicone microemulsion which is capable of forming a coating providing an attractive, bright, shiny, like-new tire appearance, having water wash and detergent wash resistance can be used in the embodiments of the invention. Microemulsions are thermodynamically stable dispersions of two immiscible liquids with carefully adjusted emulsifiers i.e., surfactants and cosurfactants. The dispersed phase consists of small droplets ranging in size from 10 to 100 microns. The criterion of thermodynarnic stability accounts for many of the properties which make microemulsions of practical interest, namely, their ability to form spontaneously when the various components are brought together in the proper temperature range, their staliility at constant chemical composition and temperature, and their stability under shear. The transparency, which follows from the small size of the dispersed phase, is an aesthetic property which is of great importance in many consumer products. The microemulsions also show a higher penetration than macroemulsions into porous materials, allow a more uniform dispersion of active substances soluble only in the disperse phase, and yield high gloss and film integrity in the case of waxes and paint vehicles.

Preferred silicone compounds suitable for the preparation of the silicone microemulsions include, but are not limited to, the amino functional silicone fluids preferably within the viscosity range from 40 centistokes (cSt) to 500,000 cSt at room temperature and blends of emulsifiable silicone-based polymers. Although it is contemplated that other silicone fluids having viscosities outside of the ranges from 40 cSt to 500,000 cSt at room temperature may also be used in the preparation of the silicone microemulsions, the preferred silicone fluids are the amino functional silicone fluids having viscosities in the range from 40 cSt to 500,000 cSt at room temperature. Also, although it is contemplated that other high molecular weight silicone polymers may also be used in the preparation of the silicone microemulsions, the preferred silicone-based polymers are the emulsifiable silicone-based polymers. U.S. Pat. Nos. 4,600,436, 4,880,557, 4,790,877 and 5,378,271, which are fully incorporated by reference herein, discuss the use of silicone-based polymers in the preparation of silicone emulsions.

The aforementioned need is met by certain embodiments of the present invention which comprise (1) silicone compounds that are capable of forming a coating providing an attractive, bright, shiny, and like-new tire appearance; (2) emulsifiers, i.e., surfactants and cosurfactants, with interfacial functionalities to emulsify the silicone compounds in the aqueous system to form the stable silicone microemulsion system; and, (3) a wetting agent which reduces the surface tension of the tire dressing composition to the extent to be able to wet and spray out on the tire surface.

Embodiments of the invention also provide methods of preparing a sprayable silicone microemulsion tire dressing product that is clear and transparent, and displays low viscosity. The product can be applied by the consumer using a bottle with a trigger sprayer. The product after spray will be capable of forming a coating providing an attractive, bright, shiny, and like new appearance on the tire.

Embodiments of the invention also provide a method of preparing a silicone microemulsion composition that is gel-based. The product can be applied by the consumer using an applicator such as a sponge onto the tire surface. The product after being applied on the tire surface is capable of forming a coating providing an attractive, bright, shiny, and like-new appearance on the tire.

Embodiments of the invention also provide a method of preparing a silicone microemulsion gel-based tire dressing product having coloring and glittering effects. The product can be applied by the consumer onto the tire surface, using an applicator such as a sponge. The product after being applied on the tire surface will be capable of forming a coating providing an attractive, bright, shiny, and like-new appearance on the tire with coloring and glittering effects.

Preferred silicone compounds are the amino functional silicone fluids having a viscosity range of about 40 cSt to 500,000 cSt at room temperature, and among the silicone-based polymers, the emulsifiable silicone-based polymers are more preferred silicone-based polymers. Other silicone compounds such as the silicone compounds having functionalities other than the amino functionality, but which possess viscosities in the range of about 40 cSt to 500,000 cSt at room temperature can also be used in embodiments of the invention. The silicone compounds of the invention are present in the range of 5 to 60% by weight, preferably 10 to 20% by weight.

The suitable emulsifiers system, i.e., surfactants and cosurfactants, should have an emulsification capability of emulsifying amino functional silicone fluids with a viscosity range within 40 cSt to 500,000 cSt at room temperature, and to achieve a stable clear and transparent appearance with long-term shelf life stability under normal storage conditions. The silicone microemulsion of the present invention has a droplet size which is below the wavelength of visible light such that the emulsion appears clear and transparent. The content of emulsifier in the compositions of the invention are in the range of 0.5 to 20% by weight, preferably 1 to 10% by weight.

In an embodiment of the invention, the wetting agent should have the capability of reducing the surface tension of the tire dressing composition to the extent that the composition is able to wet the tire surface. Preferably, the wetting agents are soluble in the silicone microemulsion systems. The preferred wetting agents include, but are not limited to, the nonionic polymeric fluorochemical wetting agents, the anionic phosphate fluorosurfactant, the anionic lithium carboxylate fluorosurfactant, and the nonionic ethoxylated fluorosurfactant wetting agents, the polyether modified polydimethylsiloxane wetting agents, the polyalkyleneoxide modified heptamethyltrisiloxane wetting agents, or organo-modified polysiloxane blend type of wetting agents. The content of wetting agents in the compositions of the invention range from 0.05 to 5% by weight, and more preferably 0.1 to 2.5% by weight.

In a preferred embodiment of the invention, the silicone microemulsion system further comprises a fluorocarbon or hydrocarbon propellant if an aerosol system is desired. For the aerosol systems, examples of preferred propellants include, but are not limited to, 1,1-difluoroethane, 1,1,1,-trifluoroethane, difluoromethane, 1,1,-difluoro-2,2,2-trifluoroethane, 1,1,2,2-tetrafluoroethane, and 1,1,1,2-tetrafluoroethane. It is noted that 1,1,1,2-tetrafluoroethane is a more preferred propellant because it is approved by the Environmental Protection Agency for use in aerosol formulations and is included as the Non-Ozone Depleting Substance (Non-ODS). However, this should not be construed to mean that 1,1,1,2-tetrafluoroethane is the only suitable propellant. Other fluorocarbon propellants listed above, although not approved by the Environmental Protection Agency, can also be used in embodiments of the invention. In fact, in circumstances where flammability is not a major concern, hydrocarbon propellants may also be used in addition to or in place of fluorocarbon propellants in embodiments of the invention.

In certain embodiments of the invention, a bio-protection chemistry preservative such as polymethoxy bicyclic oxazolidine of a biocide is added to prevent potential microbiological problems resulting from microorganisms that might exist in the water based system of the compositions of the embodiments of the invention.

For aerosol type of products, the formation of rust is a potential problem when the tire dressing composition is in a can. Suitable corrosion inhibitors include, but are not limited to, triethanolamine dinonylnaphthalene, boric acid-triethanolamine salt, phosphoric acid-triethanolamine salt, ammonia, triethanolamine and capryloamphoprionate, although any other known corrosion inhibitors can be used. Corrosion inhibitors can be used alone or in combination of varying proportions. In some other embodiments, a freezing point depressant is added to lower the freezing point of the tire dressing composition in the aerosol can. Suitable freezing point depressants include, but are not limited to, ethylene glycol and propylene glycol, although other freezing point depressants may also be used. Freezing point depressants can be used alone or in combination of varying proportions.

In certain embodiments, antifoaming agents are added to the tire dressing composition to prevent foaming of the tire dressing composition. Suitable antifoaming agents include, but are not limited to, silicone based antifoaming agents, mineral oil based antifoaming agents, and a defoaming system of a mixture of foam destroying polymers and hydrophobic solids (polyureas). Examples of a silicone based antifoaming agents are the silica filled polydimethyl siloxane and the polyether modified polysiloxanes. Preferably, the silica filled polydimethyl siloxane is used in embodiments of the invention.

In certain embodiments of the invention, pigments such as the iron oxides and platelets of mica, or titanium dioxide and platelets of mica, or titanium dioxide, stannic oxide, and platelets of mica may be added to the silicone microemulsion based gel type tire dressing product to provide various coloring effects. Further, in certain embodiments, precision cut metallic glitter particles consisting of pigmented polyethylene terephthalate, or some other types of precision cut film/foil glitter particles such as the aluminized PVC film or ultra thin aluminum foil coated with thermoset crosslinked epoxy system, or some other types of precision cut brilliant metallized polyester film glitter particles, are added the silicone microemulsion based gel type tire dressing product to deliver the glittering effects with brilliance, The coloring and glittering effects can be achieved in a single product by combining the aforementioned pigments and glitters.

The tire dressing compositions of the present invention may be stored in PVC bottles, PET bottles or aerosol cans.

An embodiment of the invention provides a method for use of compositions comprising a silicone microemulsion system, as described earlier, wherein said compositions are applied to tires to form a durable, shiny, water repellant coating that is resistant to water and detergent.

In order to more thoroughly illustrate the present invention, the following working examples are provided.

EXAMPLES

Example 1

The core composition of an example tire dressing composition produced in accordance with the present invention was the silicone microemulsion based on the amino functional silicones emulsified with the carefully adjusted emulsifiers system, i.e., surfactants and cosurfactants. The surfactants combination has the emulsification capability of emulsifying the amino functional silicone to achieve the stable clear and transparent appearance. The dispersed phase consists of small droplets and the translucence and clarity follow from the small size of the dispersed phase. 0.1% by weight of the nonionic polymeric fluorochemical surfactant was added. It has the capability of reducing the surface tension of the tire dressing composition to the extent to be able to wet and spray out on the tire surface or tire surface previously treated with silicone based tire dressing material and is compatible with the silicone microemulsion. 250 ppm by weight of the silica filled polydimethyl siloxane antifoaming agent was added to avoid foaming. 0.20% by weight of polymethoxy bicyclic oxazolidine, a bio-protection chemistry preservative, is added to prevent the potential microbiological problems resulting from possible microorganisms exist in the water based system. The composition was applied through a trigger sprayer.

Example 2

The core composition of an example tire dressing composition produced in accordance with the present invention was the silicone microemulsion based on the amino functional silicones emulsified with the carefully adjusted emulsifiers system, i.e., surfactants and cosurfactants. The surfactants combination has the emulsification capability of emulsifying the amino functional silicone to achieve the stable clear and transparent appearance. The dispersed phase consists of small droplets and the translucence and clarity follow from the small size of the dispersed phase. 0.1% by weight of the anionic phosphate fluorosurfactant was added. It has the capability of reducing the surface tension of the tire dressing composition to the extent to be able to wet and spray out on the tire surface or tire surface previously treated with silicone based tire dressing material and is compatible with the silicone microemulsion. 250 ppm by weight of the silica filled polydimethyl siloxane antifoaming agent was added to avoid foaming. 0.20% by weight of polymethoxy bicyclic oxazolidine, a bio-protection chemistry preservative, is added to prevent the potential microbiological problems resulting from possible microorganisms exist in the water based system. The composition was applied through a trigger sprayer.

Example 3

The core composition of an example tire dressing composition produced in accordance with the present invention was the silicone microemulsion based on the emulsifiable silicone-based polymers emulsified with the carefully adjusted emulsifiers system, i.e., surfactants and cosurfactants. The surfactants combination has the emulsification capability of emulsifying the amino functional silicone to achieve the stable clear and transparent appearance. The dispersed phase consists of small droplets and the translucence and clarity follow from the small size of the dispersed phase. 0.1% by weight of the nonionic polymeric fluorochemical surfactant was added. It has the capability of reducing the surface tension of the tire dressing composition to the extent to be able to wet and spray out on the tire surface or tire surface previously treated with silicone based tire dressing material and is compatible with the silicone microemulsion. 250 ppm by weight of the silica filled polydimethyl siloxane antifoaming agent was added to avoid foaming. 0.20% by weight of polymethoxy bicyclic oxazolidine, a bio-protection chemistry preservative, is added to prevent the potential microbiological problems resulting from possible microorganisms exist in the water based system. The composition was applied through a trigger sprayer.

Example 4

The core composition of an example tire dressing composition produced in accordance with the present invention was the silicone microemulsion based on the emulsifiable silicone-based polymers emulsified with the carefully adjusted emulsifiers system, i.e., surfactants and cosurfactants. The surfactants combination has the emulsification capability of emulsifying the amino functional silicone to achieve the stable clear and transparent appearance. The dispersed phase consists of small droplets and the translucence and clarity follow from the small size of the dispersed phase. 0.1% by weight of the anionic phosphate fluorosurfactant was added. It has the capability of reducing the surface tension of the tire dressing composition to the extent to be able to wet and spray out on the tire surface or tire surface previously treated with silicone based tire dressing material and is compatible with the silicone microemulsion. 250 ppm by weight of the silica filled polydimethyl siloxane antifoaming agent was added to avoid foaming. 0.20% by weight of polymethoxy bicyclic oxazolidine, a bio-protection chemistry preservative, is added to prevent the potential microbiological problems resulting from possible microorganisms exist in the water based system. The composition was applied through a trigger sprayer.

Example 5

The core composition of an example tire dressing composition produced in accordance with the present invention was the silicone microemulsion based on the amino functional silicones emulsified with the carefully adjusted emulsifiers system, i.e., surfactants and cosurfactants. The surfactants combination has the emulsification capability of emulsifying the amino functional silicone to achieve the stable clear and transparent appearance. The dispersed phase consists of small droplets and the translucence and clarity follow from the small size of the dispersed phase. 0.1% by weight of the nonionic polymeric fluorochemical surfactant was added. It has the capability of reducing the surface tension of the tire dressing composition to the extent to be able to wet and spray out on the tire surface or tire surface previously treated with silicone based tire dressing material and is compatible with the silicone microemulsion. 250 ppm by weight of the silica filled polydimethyl siloxane antifoaming agent was added to avoid foaming. 0.20% by weight of polymethoxy bicyclic oxazolidine, a bio-protection chemistry preservative, is added to prevent the potential microbiological problems resulting from possible microorganisms exist in the water based system. The tire dressing composition was stored in an aerosol can. 20% by weight of the 1,1,1,2-tetrafluoroethane, which is classified as a Non-Ozone Depleting Substance and is approved by the Environmental Protection Agency for use in aerosol formulations. 1% by weight of the triethanolamine dinonylnaphthalene corrosion inhibitor was added.

Example 6

The core composition of an example tire dressing composition produced in accordance with the present invention was the silicone microemulsion based on the amino functional silicones emulsified with the carefully adjusted emulsifiers system, i.e., surfactants and cosurfactants. The surfactants combination has the emulsification capability of emulsifying the amino functional silicone to achieve the stable clear and transparent appearance. The dispersed phase consists of small droplets and the translucence and clarity follow from the small size of the dispersed phase. 0.1% by weight of the nonionic polymeric fluorochemical surfactant was added. It has the capability of reducing the surface tension of the tire dressing composition to the extent to be able to wet and spray out on the tire surface or tire surface previously treated with silicone based tire dressing material and is compatible with the silicone microemulsion. 0.20% by weight of polymethoxy bicyclic oxazolidine, a bio-protection chemistry preservative, is added to prevent the potential microbiological problems resulting from possible microorganisms exist in the water based system. This provides a "Clear & Transparent" relatively higher viscosity silicone microemulsion based gel type tire dressing product. The product can be simply applied by the consumer by an applicator such as a sponge onto the tire surface.

Example 7

The core composition of an example tire dressing composition produced in accordance with the present invention was the silicone microemulsion based on the amino functional silicones emulsified with the carefully adjusted emulsifiers system, i.e., surfactants and cosurfactants. The surfactants combination has the emulsification capability of emulsifying the amino functional silicone to achieve the stable clear and transparent appearance. The dispersed phase consists of small droplets and the translucence and clarity follow from the small size of the dispersed phase. 0.1% by weight of the nonionic polymeric fluorochemical surfactant was added. It has the capability of reducing the surface tension of the tire dressing composition to the extent to be able to wet and spray out on the tire surface or tire surface previously treated with silicone based tire dressing material and is compatible with the silicone microemulsion. 0.20% by weight of polymethoxy bicyclic oxazolidine, a bio-protection chemistry preservative, is added to prevent the potential microbiological problems resulting from possible microorganisms exist in the water based system. 0.40% by weight of pigment material, which is the platelets of mica coated with titanium dioxide and a small amount of stannic oxide and chromium hydroxide, was added to achieve the coloring effect. 1.0% by weight of glitter material, which is precision cut 0.001" thick vacuum metallized polyethylene terephthalate film color coated with a thermoset crosslinked epoxy system, was added to achieve the glittering effect. This provides a "Clear & Transparent" relatively higher viscosity silicone microemulsion based gel type tire dressing product with coloring and glittering effects. The product can be simply applied by the consumer by an applicator such as a sponge onto the tire surface.

As demonstrated above, embodiments of the invention provide one or more of the following advantages including but not limited to, providing an attractive, bright, shiny and like-new appearance on the tire, with optional coloring and glittering effects.

While the invention has been described with respect to a number of limited embodiments, variations and modifications can exist. For example, although non-flammable, non-toxic, and environmentally friendly propellants are preferred, other propellants which do not meet all three requirements may still be used in some embodiments of the invention. Although the invention is described with reference to a tire dressing application, the application of the invention is not limited only to a tire. Rather, the invention is applicable to other exterior and interior automobile surfaces found in most modern automobiles and other on-road motor vehicles. These surfaces include metal or fiber reinforced plastic body panels whose exterior surfaces are coated with paint, metal, vinyl, any other plastic finishes. Many such vehicles also include metal bumpers and trim usually plated with chrome or other bright, silvery metal.

The appended claims intend to cover all such modifications and variations as falling with the scope of the invention.

What is claimed is:

1. A tire dressing composition, comprising:
   an aqueous silicone microemulsion comprising amino functional silicone fluids having viscosities ranging from about 40 cSt to 500,000 cSt at room temperature dispersed in water;
   an effective amount of an emulsifier system comprising surfactants and cosurfactants having interfacial functionalities to emulsify and disperse said silicone fluids in said water wherein said dispersed silicone fluids have a droplet size of 10 to 100 microns; and
   a polyalkyleneoxide modified heptamethyltrisiloxane wetting agent for reducing the surface tension of said silicone fluids;
   wherein said composition is sprayable.

2. The tire dressing composition of claim 1, wherein the silicone microemulsion comprises emulsifiable silicone-based polymers.

3. The tire dressing composition of claim 1, wherein the silicone microemulsion comprises silicone fluids with functionalities other than the amino functionality having viscosities ranging from about 40 cSt to 500,000 cSt at room temperature.

4. The tire dressing composition of claim 1, further comprising an antifoaming agent.

5. The tire dressing composition of claim 4, wherein the antifoaming agent is selected from the group consisting of silica-filled polydimethyl siloxane, polyether modified polysiloxane, and a mixture of foam destroying polymers and hydrophobic solids.

6. The tire dressing composition of claim 1, further comprising a fluorocarbon propellant.

7. The tire dressing composition of claim 6, wherein the propellant is selected from the group consisting of 1,1,2,2-tetrafluoroethane, 1,1-difluoroethane, 1,1,-trifluoroethane, difluoromethane, 1,1,-difluoro-2,2,2-trifluoroethane, and 1,1,1,2-tetrafluoroethane.

8. The tire dressing composition of claim 1, further comprising a corrosion inhibitor.

9. The tire dressing composition of claim 8, wherein the corrosion inhibitors are selected from the group consisting of triethanolamine dinonylnaphthalene, boric acid-triethanolamine salt, phosphoric acid-triethanolamine salt, ammonia, triethanolamine, capryloamphoprionate, and mixtures thereof.

10. The tire dressing composition of claim 1, further comprising a freezing point depressant.

11. The tire dressing composition of claim 10, wherein the freezing point depressants are selected from the group consisting of ethylene glycol and propylene glycol.

12. The tire dressing composition of claim 1, wherein the tire dressing composition is stored in a PVC plastic bottle.

13. The tire dressing composition of claim 1, wherein the tire dressing composition is stored in a PET plastic bottle.

14. The tire dressing composition of claim 1, wherein the tire dressing composition is stored in an aerosol can.

15. A method of forming a durable, shiny, water repellant coating on a tire, comprising:
   spraying a tire-dressing composition on a surface of a tire, the tire-dressing composition comprising:
      an aqueous silicone microemulsion comprising amino functional silicone fluids having viscosities ranging from about 40 cSt to 500,000 cSt at room temperature dispersed in water;
      an effective amount of an emulsifier system comprising surfactants and cosurfactants having interfacial functionalities to emulsify and disperse said silicone fluids in said water wherein said dispersed silicone fluids have a droplet size of from 10 to 100 microns; and
      a polyalkyleneoxide modified heptamethyltrisiloxane wetting agent for reducing the surface tension of said silicone fluids.

16. The method of claim 15, wherein the silicone microemulsion comprises emulsifiable silicone-based polymers.

17. The method of claim 15, wherein the silicone microemulsion comprises silicone fluids with functionalities other than the amino functionality having viscosities ranging from about 40 cSt to 500,000 cSt at room temperature.

18. The method of claim 15, further comprising an antifoaming agent.

19. The method of claim 18, wherein the antifoaming agent is selected from the group consisting of silica-filled polydimethyl siloxane, polyether modified polysiloxane, and a mixture of foam destroying polymers and hydrophobic solids.

20. The method of claim 15, further comprising a fluorocarbon propellant.

21. The method of claim 20, wherein the propellant is selected from the group consisting 1,1,2,2-tetrafluoroethane, 1,1-difluoroethane, 1,1,1-trifluoroethane, difluoromethane, 1,1,-difluoro-2,2,2-trifluoroethane, and 1,1,1,2-tetrafluoroethane.

22. The method of claim 15, further comprising a corrosion inhibitor.

23. The method of claim 22, wherein the corrosion inhibitors are selected from the group consisting of triethanolamine dinonylnaphthalene, boric acid-triethanolamine salt, phosphoric acid-triethanolamine salt, ammonia, triethanolamine, capryloamphoprionate, and mixtures thereof.

24. The method of claim 15 further comprising a freezing point depressant.

25. The method of claim 24, wherein the freezing point depressants are selected from the group consisting of ethylene glycol and propylene glycol.

* * * * *